United States Patent
Muscato

(10) Patent No.: US 7,922,082 B2
(45) Date of Patent: Apr. 12, 2011

(54) DYNAMIC CARD VALIDATION VALUE

(75) Inventor: Michael A. Muscato, Winter Park, FL (US)

(73) Assignee: M2 International Ltd., St. John's (AG)

( * ) Notice: Subject to any disclaimer, the term of this patent is extended or adjusted under 35 U.S.C. 154(b) by 183 days.

(21) Appl. No.: 12/348,134

(22) Filed: Jan. 2, 2009

(65) Prior Publication Data

US 2009/0173782 A1 Jul. 9, 2009

Related U.S. Application Data

(60) Provisional application No. 61/009,981, filed on Jan. 4, 2008.

(51) Int. Cl.
*G06K 5/00* (2006.01)
(52) U.S. Cl. ...................................... 235/380
(58) Field of Classification Search .................. 235/379, 235/380, 492, 487; 705/41, 50
See application file for complete search history.

(56) References Cited

U.S. PATENT DOCUMENTS

| | | | |
|---|---|---|---|
| 7,427,033 B1 * | 9/2008 | Roskind | 235/492 |
| 7,740,168 B2 | 6/2010 | Hammad | |
| 2005/0171905 A1 | 8/2005 | Wankmueller et al. | |
| 2006/0278698 A1 * | 12/2006 | Lovett | 235/380 |
| 2007/0114274 A1 | 5/2007 | Gibbs et al. | |
| 2007/0250920 A1 * | 10/2007 | Lindsay | 726/7 |
| 2008/0110983 A1 * | 5/2008 | Ashfield | 235/382 |

FOREIGN PATENT DOCUMENTS

WO   WO 2007/149762 A2   12/2007

* cited by examiner

*Primary Examiner* — Michael G Lee
*Assistant Examiner* — Tabitha Chedekel
(74) *Attorney, Agent, or Firm* — Merchant & Gould P.C.

(57) ABSTRACT

As described herein, a card services provider dynamically generates a card verification value (CVV) for a transaction card and sends the dynamically-generated CVV to a cardholder. The card services provider generates the dynamically-generated CVV such that the dynamically-generated CVV is substantially unpredictable based on other dynamically-generated CVVs for the transaction card. The dynamically-generated CVV is only valid for a limited period of time and/or for a limited number of economic transactions. The cardholder uses the dynamically-generated CVV as part of an economic transaction with a merchant. Because the dynamically-generated CVV is only valid for a limited number of economic transactions and/or for a limited period of time, it may be difficult for a thief to repeatedly use the transaction card to make economic transactions.

13 Claims, 11 Drawing Sheets

Web Browser

[ Back ]  [ Forward ]  [ Home ]  [ Refresh ]

Verification Result
CVV          365
End Eff. Date   13-DEC-07

Generate Another
Card Number   4213980029999990          [ Generate ]

Verify CVV2 / CVV3
Card Number   4213980029999990  /-228
CVV2 / CVV3   365                /-230
Exp. Date     0112               /-232
Verif. Flag   Y                                  [ Verify ]
                                 -242

Web Browser — 250

Back | Forward | Home | Refresh

Verification Result
CVV         365
End Eff. Date  13-DEC-07

Generate Another
Card Number  4213980029999990    [Generate]

Verify CVV2 / CVV3
Card Number  4213980029999990  — 228
CVV2 / CVV3  365  — 230
Exp. Date    0112  — 232
Verif. Flag  N
                    — 242    [Verify]

— 251

DYNAMIC CARD VALIDATION VALUE

CROSS-REFERENCE TO RELATED APPLICATIONS

This application claims the benefit of U.S. Provisional Application No. 61/009,981, filed Jan. 4, 2008, the entire content of which is hereby incorporated by reference.

BACKGROUND

Credit cards are an indispensable part of today's economy. Millions of people around the world use credit cards every day to purchase goods and services. In general, a bank issues a credit card to an individual or organization. Such an individual or organization is referred to as a "cardholder." After a bank issues a credit card to a cardholder, the cardholder can use the credit card to make charges against a line of credit extended to the cardholder by the bank.

A typical credit card is associated with several pieces of information. These pieces of information include a card number, an expiry date, and a service code. A card number is a sequence of digits that identifies a bank that issued the credit card and an account number that is specific to the cardholder. In some circumstances, a card number is also referred to as a "primary account number" (PAN). An expiry date of a credit card indicates a date when the credit card expires. A service code of a credit card indicates how the cardholder is permitted to use the credit card.

In addition, a credit card may be associated with a first card verification value and a second card verification value. The first card verification value (CVV1) and the second card verification value (CVV2) are values used to increase protection against credit card fraud. An issuing bank may generate the CVV1 of a credit card by digitally encrypting the card number, the expiry date, and the service code of the credit card using a secret encryption key. The issuing bank may generate the CVV2 of a credit card by digitally encrypting the same information using a different encryption method. The CVV1 of a credit card, along with the card number, expiry date, and service code of the credit card, is typically stored in a magnetic stripe on the back of the credit card. Because the CVV1 of the credit card is stored in the magnetic stripe of the credit card, the CVV1 of the credit card is not visible to the cardholder. The CVV2 of a credit card is typically printed on the back or front of the credit card such that the CVV2 of the credit card is visible to the cardholder.

A cardholder can use a credit card to initiate an economic transaction in a variety of ways. For instance, a cardholder could present a credit card to a merchant at a point of sale. In this instance, the merchant could swipe the credit card through a device that reads information stored in a magnetic stripe on the back of the credit card. The merchant then uses the information stored in the magnetic stripe, including the CVV1 of the credit card, to complete the credit card transaction. In another instance, a cardholder could provide credit card information to a merchant without presenting the physical credit card to the merchant. In this instance, the cardholder enters the card number, the expiry data, and the CVV2 of the credit card into a web page presented by a web browser application. The web browser application then electronically transmits the credit card information via a network (e.g., the Internet) to the merchant. After receiving the information via the network, the merchant uses the information to complete the transaction.

In general, the CVV1 of a credit card reduces the risk of credit card fraud by preventing someone who knows all of the visible information on a credit card from making a counterfeit credit card that is useable in a card reader. For instance, a person could copy the visible information of a credit card and program this information onto a counterfeit card with a magnetic stripe. However, this person would not know the CVV1 of the credit card from visual inspection and would not be able to derive the CVV1 of the credit card from any visible information on the credit card. Therefore, when this person attempts to use the counterfeit card, the card is declined because the magnetic stripe of the counterfeit card does not include the CVV1 of the credit card.

In general, the CVV2 of a credit card reduces the risk of credit card fraud by helping to ensure that the user of the credit card actually has physical possession of the credit card. To illustrate why the CVV2 of a credit card may help ensure that the user of the credit card actually has physical possession of the credit card, consider that merchants typically maintain records of all of the information stored in the magnetic stripes of credit cards used to purchase goods or services from the merchants. A malicious party could use this information to create a counterfeit card having a magnetic stripe that includes the CVV1 of the credit card. However, merchants are prohibited from storing CVV2 values of credit cards. Furthermore, most online merchants require the submission of CVV2 values with online purchases. Thus, a thief who has access to the information stored in a magnetic stripe of a credit card would not be able to purchase goods or services from such online merchants.

However, the CVV1 and the CVV2 of a credit card do not prevent all types of credit card fraud. For instance, a thief who has all of the information printed on the credit card (i.e., the card number, the expiration date, and the CVV2) could use this information to complete an online purchase. A thief could obtain the information printed on the credit card in a variety of ways. For instance, the thief could open mail that contains the credit card before the credit card is delivered to the proper cardholder. In this instance, the thief could copy down the information, reseal the envelope, and forward the envelope to the proper cardholder.

SUMMARY

As described herein, a card services provider dynamically generates a card verification value (CVV) for a transaction card and sends the dynamically-generated CVV to a cardholder. The card services provider generates the dynamically-generated CVV such that the dynamically-generated CVV is substantially unpredictable based on other dynamically-generated CVVs for the transaction card. The dynamically-generated CVV is only valid for a limited period of time and/or for a limited number of economic transactions. The cardholder uses the dynamically-generated CVV as part of an economic transaction with a merchant. Because the dynamically-generated CVV is only valid for a limited number of economic transactions and/or for a limited period of time, it may be difficult for a thief to repeatedly use the transaction card to make economic transactions.

One example aspect of the disclosed technology is a method for performing an economic transaction using a transaction card. The method comprises using a cardholder device to receive from a card services provider a first set of data, the first set of data indicating a dynamically-generated card verification value (CVV) for a transaction card. The dynamically-generated CVV is a sequence of characters based on a card number of the transaction card, an expiry date of the transaction card, and a dynamic service code. The dynamic service code is selected by the card services provider such that the dynamically-generated CVV is substantially unpredictable based on previously generated dynamically-generated CVVs for the transaction card. The transaction card includes a magnetic stripe that stores the card number, the expiry date, and a first statically-generated CVV. The card number, the expiry date, and a second statically-generated CVV are physically printed on the transaction card. The method also comprises after receiving the dynamically-generated CVV from the card services provider, using the card number of the transaction card, the expiry date of the transaction card, and the dynamically-generated CVV to initiate the economic transaction Another example aspect of the disclosed technology is a computer-readable medium comprising instructions that, when executed by a processor, cause a card processing server to perform automatically select a dynamic service code such that the dynamic service code is substantially unpredictable based on previously requested dynamically-generated card verification values (CVVs) for a transaction card. The instructions also cause the card processing server to automatically generate a dynamically-generated CVV for the transaction card, wherein the dynamically-generated CVV is based on a card number of the transaction card, an expiry date of the transaction card, and the dynamic service code. In addition, the instructions cause the card processing server to automatically send, from the card processing server to a cardholder device, a first set of data, the first set of data indicating the dynamically-generated CVV. In response to receiving a transaction request at the card processing server, the instructions cause the card processing server to automatically determine whether a provided CVV corresponds to the dynamically-generated CVV. The transaction request is a request for an economic transaction. The transaction request specifies the provided CVV and a card number of the transaction card. In addition, the instructions cause the card processing server to record a charge against an account of a cardholder of the transaction card when it is determined that the provided CVV corresponds to the dynamically-generated CVV.

Another example aspect of the disclosed technology is a card processing server comprises a processor, a network interface, and a data storage system storing instructions. When executed by the processor, the instructions cause the card processing server to use a pseudo-random process to select a dynamic service code. The instructions also cause the card processing server to generate a dynamically-generated CVV based on a card number of a transaction card, an expiry date of the transaction card, and the dynamic service code. Furthermore, the instructions cause the card processing server to use the network interface to send to a cardholder device a first set of data, the first set of data indicating the dynamically-generated CVV. In addition, the instructions cause the card processing server to determine, in response to receiving a transaction request from a merchant, whether a provided CVV corresponds to the dynamically-generated CVV. The transaction request specifies the provided CVV, the card number of the transaction card, the expiry date of the transaction card, the merchant, and an amount of an economic transaction. Furthermore, the instructions cause the card processing server to automatically determine, when it is determined that the provided CVV corresponds to the dynamically-generated CVV, whether the dynamically-generated CVV is valid. The instructions also cause the card processing server to automatically record a charge against an account of a cardholder of the transaction card when it is determined that the provided CVV corresponds to the dynamically-generated CVV and the dynamically-generated CVV is valid.

The details of one or more example implementations are set forth in the accompanying drawings and the description below. Other features, objects, and advantages will be apparent from the description, drawings, and claims.

BRIEF DESCRIPTION OF THE FIGURES

FIG. 10 is a screenshot of an example user interface that may be displayed when a dynamically-generated CVV has been successfully verified.

FIG. 11 is a screenshot of an example user interface that may be displayed when a dynamically-generated CVV has not been successfully verified.

DETAILED DESCRIPTION

Figure 1:
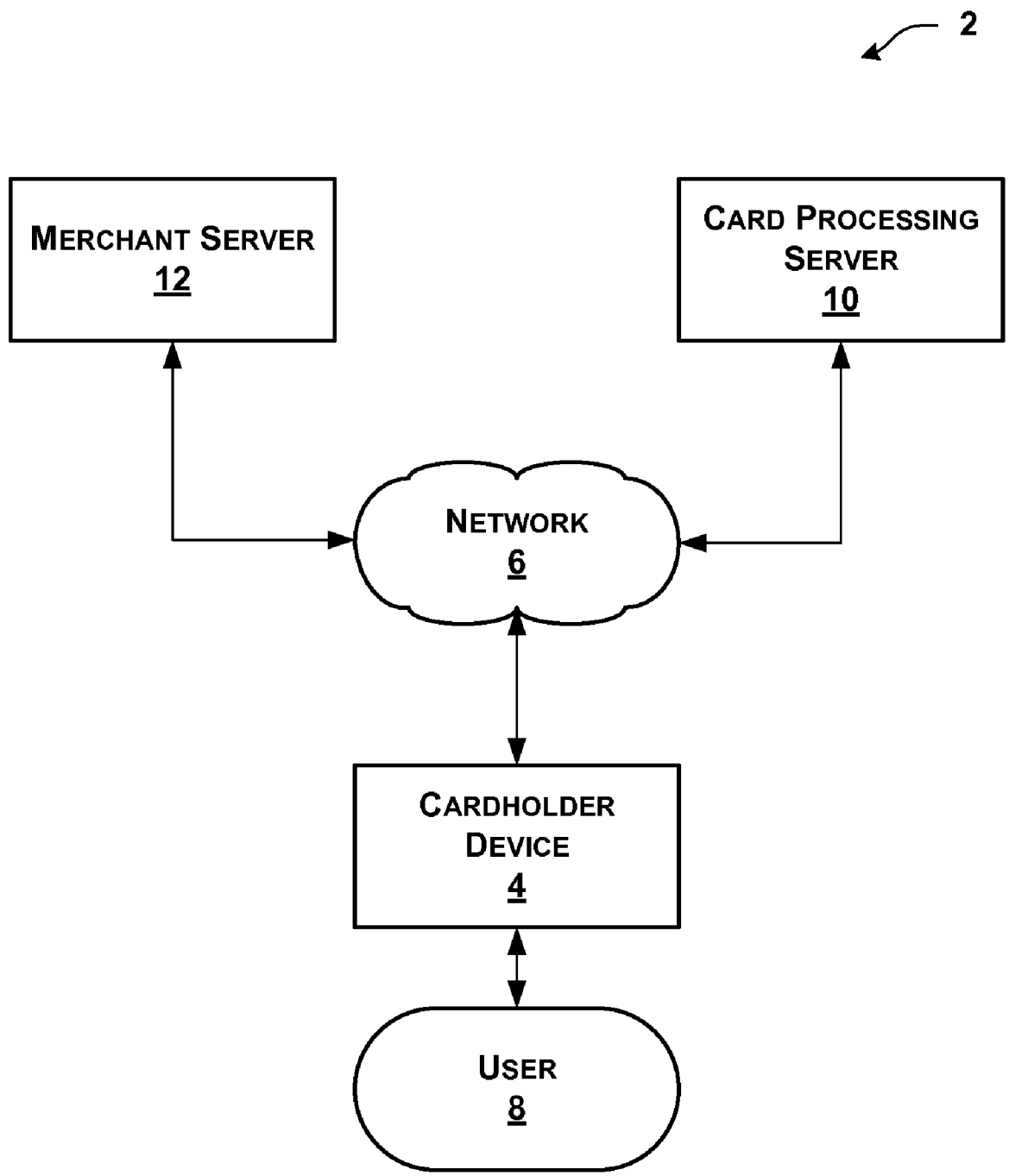
FIG. 1 is a block diagram illustrating a first example system that uses dynamically-generated card verification values (CVVs).

FIG. 1 is a block diagram illustrating an example system 2 that uses dynamically-generated card verification values (CVVs). The example of FIG. 1 illustrates only one example system that implements the techniques described in this disclosure. It should be appreciated that many other systems may implement the techniques of this disclosure.

As illustrated in the example of FIG. 1, system 2 comprises a cardholder device 4. Cardholder device 4 may be a wide variety of different types of electronic computing devices. For instance, cardholder device 4 may be a personal computer, a laptop computer, a television set-top box, a device integrated into a vehicle, a server device, a telephone, a mobile handheld device, or another type of electronic computing device. As used in this disclosure, a mobile handheld device may be a cellular telephone, a personal digital assistant (PDA), a personal media player, a "smart" phone, a two-way pager, or another type of portable electronic computing device.

Cardholder device 4 is communicatively connected to a network 6. Network 6 may comprise one or more different types of electronic communication network. For example, network 6 may include a wide-area network, such as the Internet. In another example, network 6 may include a standard telephone network and/or a cellular telephone network. In other examples, network 6 may include a local area network, a metropolitan area network, a global area network, or another type of network. Furthermore, network 6 may comprise one or more wired connections and/or one or more wireless connections.

A user 8 interacts with cardholder device 4 to perform economic transactions using a transaction card. As used in this disclosure, a "transaction card" is a token that may be used as part of an economic transaction. Credit cards, debit cards, Automated Teller Machine (ATM) cards, gift cards, and stored-value cards are examples of transaction cards. It should be understood that a transaction card does not necessarily have to be in the form of a card. For instance, a transaction card could be in the shape of a ring. Furthermore, as used in this disclosure, an "economic transaction" is an exchange of money between financial accounts. Examples of economic transactions include, but are not limited to, purchases, donations, payments, gifts, ATM cash withdrawals, ATM deposits, money order/cashier's check withdrawals, transfers between bank accounts, and other types of exchanges of money between two or more financial accounts.

Because of widespread familiarity of credit cards, the remaining description and examples of this disclosure refer to credit cards. However, unless otherwise noted, it should be understood that all such references to credit cards are applicable to transaction cards.

In the example of FIG. 1, user 8 may be a cardholder of a credit card. As used in this disclosure, a "cardholder" is a person or entity to whom a credit card issuer has issued a credit card. For example, user 8 may be an individual person, an employee of an organization, a business organization, a non-profit organization, a governmental organization, or another type of natural or legal person or an agent thereof. Alternatively, user 8 may be a person or entity who is attempting to interact with cardholder device 4 to perform economic transactions using the credit card without authorization of a cardholder of the credit card.

To perform an economic transaction using the credit card, user 8 may use cardholder device 4 to request a dynamically-generated CVV for the credit card. A dynamically-generated CVV for a credit card is a dynamically-generated sequence of characters designed to make it more difficult to use the credit card fraudulently. The characters may be numerical characters, alphabetical characters, alphanumeric characters, non-standard characters, Asian language characters, Unicode characters, African language characters, Arabic characters, Cyrillic characters, and/or other types of symbols. A dynamically-generated CVV for a credit card is based, at least in part, on a card number of the credit card, an expiry date of the credit card, and a dynamic service code. The dynamic service code is dynamically selected such that the dynamically-generated CVV is substantially unpredictable based on previously released dynamically-generated CVVs for the credit card. A previously released dynamically-generated CVV for a credit card is a dynamically-generated CVV for the credit card that has been released to a cardholder of credit card or another entity. In some implementations, the dynamically-generated CVV may only be valid for a limited period of time and/or for a limited number of economic transactions.

User 8 may use cardholder device 4 to request a dynamically-generated CVV in a variety of ways. For example, user 8 may cause cardholder device 4 to execute a web browser application. In this example, user 8 may use the web browser application to access a web page that contains features that allow user 8 to request a dynamically-generated CVV for the credit card. In a second example, user 8 may cause cardholder device 4 to execute a special-purpose software application that requests a dynamically-generated CVV for the credit card. The special-purpose software application may be a Java Applet, a desktop "widget," or another type of software application. In a third example, cardholder device 4 may be a telephone. In this third example, user 8 may use cardholder device 4 to place a telephone call to an automated service, thereby requesting a dynamically-generated CVV for the credit card. In a fourth example, cardholder device 4 may be a cellular telephone. In this fourth example, user 8 may use cardholder device 4 to send a text message to an automated service, thereby requesting a dynamically-generated CVV for the credit card. In this fourth example, cardholder device 4 may use a Short Message Service (SMS) protocol to send the text message to the automated service.

When user 8 uses cardholder device 4 to request a dynamically-generated CVV for a credit card, cardholder device 4 sends a request via network 6 to a card processing server 10. Card processing server 10 is an electronic computing system that provides a card processing service. Card processing server 10 comprises one or more electronic computing devices operated by or on behalf of a card services provider. For instance, card processing server 10 may be a server farm operated by a card services provider or operated by a third-party organization that has contracted with a card services provider to receive requests for dynamically generated CVVs. In another instance, card processing server 10 may be a single server device, such as a server blade or a mainframe computer. The card services provider is an entity that provides card processing services. For example, the card services provider may be a credit card issuer that issued the credit card or an entity that processes credit card transactions on behalf of, or in coordination with, a credit card issuer.

In response to receiving the request for a dynamically-generated CVV, card processing server 10 dynamically generates a CVV for the credit card. As discussed in detail below, card processing server 10 may dynamically generate the CVV for the credit card in a variety of ways. After card processing server 10 dynamically generates the CVV for the credit card, card processing server 10 stores the dynamically-generated CVV in a database. Furthermore, card processing server 10 stores validation information in the database. Card processing server 10 uses the validation information to validate received CVVs for the credit card. For example, the dynamically-generated CVV may only be valid for a limited period of time. In this example, to ensure that the dynamically-generated CVV is only valid for the limited period of time, card processing server 10 may store validation information that indicates a last time that the dynamically-generated CVV is valid. In this example, card processing server 10 may establish a time period associated with the dynamically-generated CVV that indicates that the dynamically-generated CVV is only valid for 48 hours after card processing server 10 generated the dynamically-generated CVV.

After storing the dynamically-generated CVV and the validation information, card processing server 10, in response to a request for a dynamically-generated CVV for the credit card, sends the dynamically-generated CVV for the credit card to cardholder device 4 via network 6. Card processing server 10 may send the dynamically-generated CVV to cardholder device 4 in a variety of ways. In a first example, card processing server 10 may execute a web server application that sends to cardholder device 4 a web page that specifies the dynamically-generated CVV. In a second example, card processing server 10 may execute a special-purpose server application that sends to cardholder device 4 a message (e.g., an extensible markup language document) that specifies the dynamically-generated CVV. In a third example, cardholder device 4 is a telephone. In this third example, card processing server 10 may send to cardholder device 4 signals that represent a vocalization of the dynamically-generated CVV. Furthermore, in this third example, when cardholder device 4 receives the signals, cardholder device 4 may audibly output the vocalization of the dynamically-generated CVV. In a fourth example, card processing server 10 may send to cardholder device 4 a text message (e.g., a short message service (SMS) message, an instant messenger message, an email message, etc.) that specifies the dynamically-generated CVV.

As illustrated in the example of FIG. 1, user 8 interacts with cardholder device 4 to use the dynamically-generated CVV for the credit card as part of an economic transaction with a merchant. When user 8 uses the dynamically-generated CVV in an economic transaction, user 8 uses the dynamically-generated CVV instead of the CVV2 of the credit card. As used in this disclosure, a merchant is any entity or individual that is allowed by a card services provider to accept credit card payments. For instance, a merchant may be a business, a government, a charity, or another entity or individual who is allowed to accept credit card payments. The credit card payments accepted by a merchant may be in exchange for goods or services, may be a donation, may be a tax payment, or may another type of payment. Furthermore, a customer is any entity or individual that uses a credit card to make payments.

User 8 may interact with cardholder device 4 to perform the economic transaction in a variety of ways. For example, cardholder device 4 may execute a web browser application. In this example, user 8 may use the web browser application to send, via network 6, a request for an e-commerce web page to a merchant server 12. Furthermore, in this example, the web browser application may receive the e-commerce web page from merchant server 12. The e-commerce web page may include features that allow user 8 to enter details of the credit card. For instance, the e-commerce web page may include a text box associated with a card number of the credit card, a text box associated with an expiry date of the credit card, and a text box associated with a CVV of the credit card. Advantageously, this web page may be the same for dynamically-generated CVVs for credit cards and statically-generated CVVs for credit cards. In other words, merchant server 12 does not need to send different web pages to receive dynamically-generated CVVs as opposed to statically-generated CVVs. As used in this disclosure, a "statically-generated CVV" is a CVV that is printed on a credit card (e.g., a CVV2) or stored in a magnetic stripe on the credit card (e.g., a CVV1). After user 8 uses the features of the web page to enter the details of the credit card, including the dynamically-generated CVV, user 8 may select a submit feature (e.g., a submit button). In this example, when user 8 selects the submit feature, cardholder device 4 may transmit the details of the credit card to merchant server 12. In this way, user 8 initiates the economic transaction.

After cardholder device 4 transmits the details of the credit card to merchant server 12, merchant server 12 may store a record of the details along with other purchase details (i.e., items purchased, amount charged, etc.). In addition, merchant server 12 automatically submits a transaction request to card processing server 10 via network 6. The transaction request specifies the details of the credit card, the amount of the charge, and a value that identifies the merchant that operates merchant server 12. When merchant server 12 submits the details of the credit card to card processing server 10, merchant server 12 may send the dynamically-generated CVV at International Standard Organization (ISO) bit 126.10. This is the same bit that merchant server 12 would use when submitting a CVV2.

In this process, it may be immaterial to merchant server 12 whether user 8 has submitted a dynamically-generated CVV for the credit card in place of a statically-generated CVV for the credit card. That is, the merchant may receive and submit either a dynamically-generated CVV for the credit card or a statically-generated CVV for the credit card in exactly the same way. This may be advantageous because the merchant may not need to change equipment or software in order to participate in economic transactions that involve dynamically-generated CVVs.

When card processing server 10 receives the details of the credit card and the amount of the charge, card processing server 10 may determine whether the CVV submitted with the details of the credit card is valid. To determine whether the CVV provided in the transaction request is valid, card processing server 10 may determine whether card processing server 10 stores a copy of a dynamically-generated CVV for the credit card. As described above, card processing server 10 stores copies of dynamically-generated CVVs for credit cards along with validation information that can be used to determine whether the dynamically-generated CVVs are valid. For example, card processing server 10 may determine how many previous economic transactions with the credit card have specified the dynamically-generated CVV. In this example, card processing server 10 may determine that the dynamically-generated CVV is not valid if any previous economic transactions have specified the dynamically-generated CVV. In other words, the dynamically-generated CVV may only be valid for one economic transaction. Alternatively, in this example, card processing server 10 may determine that the dynamically-generated CVV for the credit card is not valid if more than a small number of economic transactions (e.g., five) have specified the dynamically-generated CVV for the credit card.

In a second example, card processing server 10 may determine that the dynamically-generated CVV for the credit card is not valid if a previous economic transaction specifying the dynamically-generated CVV exceeded a given amount of money. For example, card processing server 10 may determine that the dynamically-generated CVV for the credit card is not valid if a previous economic transaction specifying the dynamically-generated CVV exceeded $1. In some situations, a merchant may apply a preliminary charge of less than $1 to a credit card to verify the credit card before applying a main charge for goods or services to the credit card. In such situations, it may be advantageous for card processing server 10 to determine that the dynamically-generated CVV for the credit card is still valid when the previous economic transaction did not exceed $1. In this second example, if card processing server 10 determines that the dynamically-generated CVV has not been specified in too many economic transactions with the credit card, card processing server 10 determines whether the time period associated with the dynamically-generated CVV has expired. If the time period associated with the dynamically-generated CVV has not expired, card processing server 10 determines that the received CVV is valid. Otherwise, card processing server 10 determines that the received CVV is not valid.

If card processing server 10 determines that the provided CVV is valid, card processing server 10 registers a charge against a credit card account of user 8. In addition, card processing server 10 sends a transaction acceptance message to merchant server 12. When merchant server 12 receives a transaction acceptance message from card processing server 10, merchant server 12 sends to cardholder device 4 a message that notifies user 8 that the economic transaction was accepted.

If card processing server 10 determines that the provided CVV is not valid, card processing server 10 does not register a charge against the credit card account of user 8. In addition, card processing server 10 sends a transaction rejection message to merchant server 12. When merchant server 12 receives a transaction rejection message from card processing server 10, merchant server 12 sends to cardholder device 4 a message that notifies user 8 that the economic transaction was rejected.

It should be appreciated that system 2 is merely one example of how dynamically-generated CVVs may be used. Many variations are possible. For instance, card processing server 10 may dynamically generate one or more CVVs for a credit card before card processing server 10 receives a request for a CVV for the credit card. In another example, user 8 may interact with a device other than cardholder device 4 to perform an economic transaction with the credit card using the dynamically-generated CVV in place of the CVV2 of the credit card.

Figure 2:
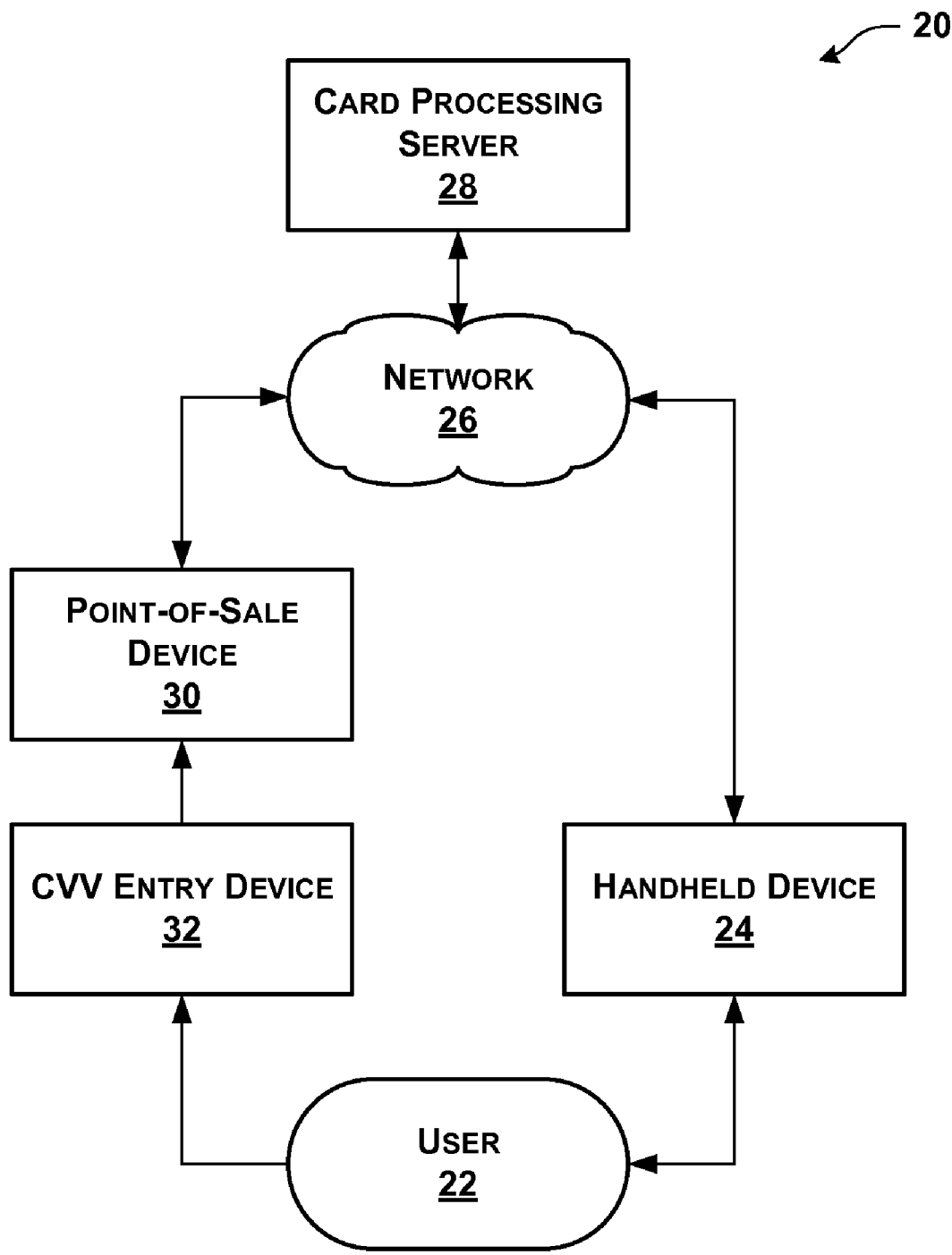
FIG. 2 is a block diagram illustrating a second example system that uses dynamically generated CVVs.

Furthermore, FIG. 2 is a block diagram illustrating an alternate example system 20 that uses dynamically generated CVVs. A user 22 may use system 20 to obtain a dynamically-generated CVV and to use the dynamically-generated CVV at a point-of-sale in a conventional store. Like user 8 in FIG. 1, user 22 may be a cardholder of a credit card or a person who has physical access to the credit card.

In the example of FIG. 2, user 22 interacts with a handheld device 24. Handheld device 24 may be cellular telephone, a PDA, a smart phone, or another type of portable electronic computing device. User 22 uses handheld device 24 to request a dynamically-generated CVV for a credit card. When user 22 uses handheld device 24 to request a dynamically-generated CVV for a credit card, handheld device 24 sends a request, via a network 26 to a card processing server 28. For example, user 22 may use handheld device 24 to send a SMS message to card processing server 28. In response to the request for a dynamically-generated CVV for the credit card, card processing server 28 sends, via network 26, a dynamically-generated CVV for the credit card to handheld device 24. For example, card processing server 28 may send, via network 26, a SMS message specifying the dynamically-generated CVV for the credit card to handheld device 24. When handheld device 24 receives the dynamically-generated CVV for the credit card, handheld device 24 presents the dynamically-generated CVV to user 22.

Subsequently, user 22 may purchase goods or services at a store. When user 22 is ready to pay for the goods or services, user 22 or a cashier may swipe the physical credit card through a magnetic stripe reader of a point-of-sale device 30. Point-of-sale device 30 may be a cash register, a self-checkout machine, or another type of point-of-sale device.

In addition to swiping the physical credit card through the magnetic stripe reader, user 22 enters the dynamically-generated CVV for the credit card into a CVV entry device 32. CVV entry device 32 may be a touch-screen monitor, a button key pad, a microphone, or another type of data entry device. When user 22 enters the dynamically-generated CVV into CVV entry device 32, CVV entry device 32 transmits the dynamically-generated CVV to point-of-sale device 30. When point-of-sale device 30 receives the dynamically-generated CVV, point-of-sale device 30 or another device transmits a transaction request to card processing server 28. The transaction request specifies a card number of the credit card, an expiry date of the credit card, a service code of the credit card, and the dynamically-generated CVV. In addition, the transaction request may specify an amount to be charged to the account of a cardholder of the credit card and may specify the merchant operating point-of-sale device 30 and other information. Card processing server 28 processes the economic transaction in a similar manner as card processing server 10 (FIG. 1) processes the transaction request.

Figure 3:
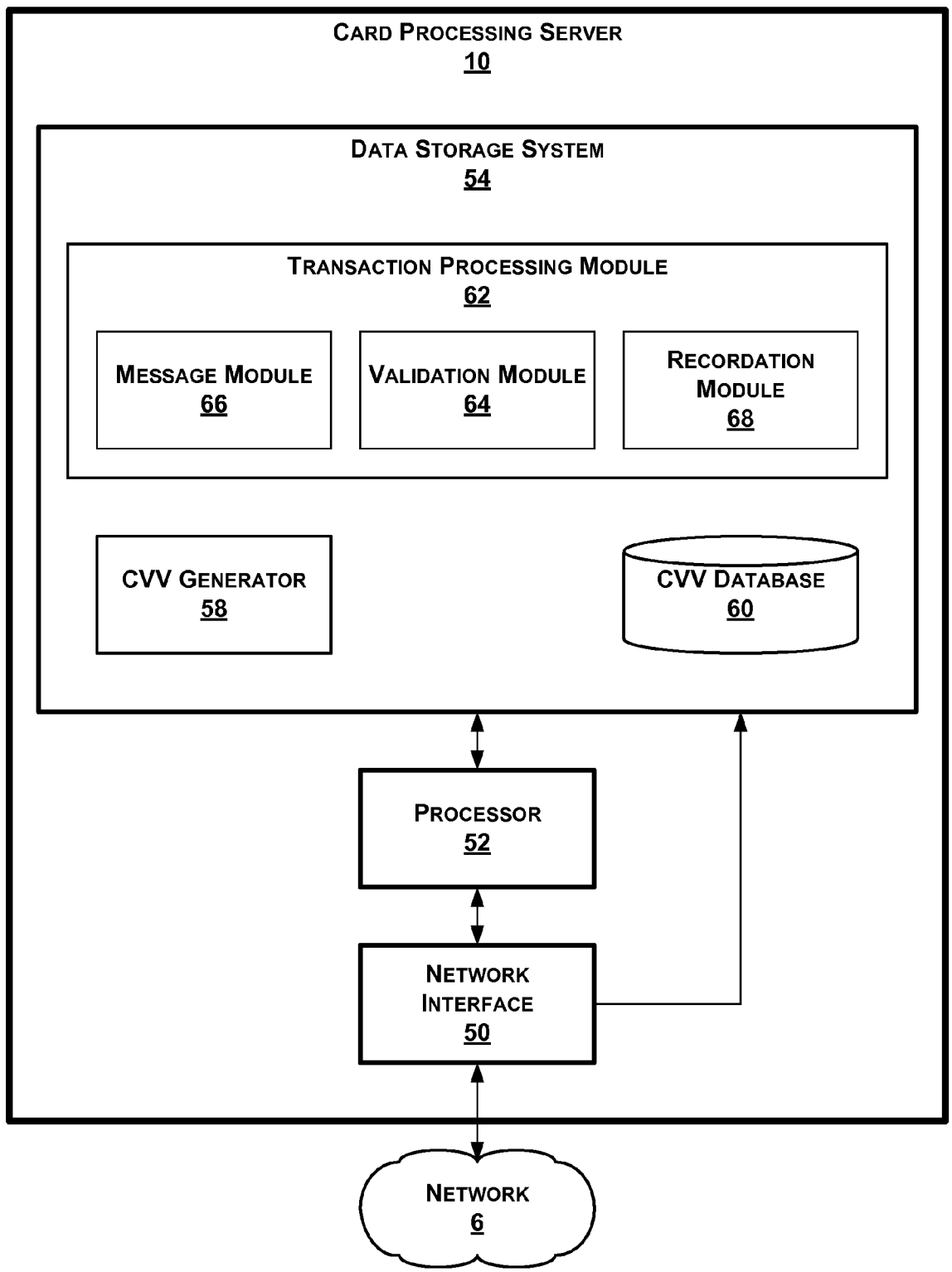
FIG. 3 is a block diagram illustrating example details of a card processing server.

FIG. 3 is a block diagram illustrating example details of card processing server 10 (FIG. 1). It should be appreciated that card processing server 28 (FIG. 2) may be implemented in a similar manner. As illustrated in the example of FIG. 3, card processing server 10 comprises a network interface 50. Network interface 50 may be a variety of different types of network interface. For instance, network interface 50 may be an Ethernet interface, a WiFi interface, a WiMax interface, a wireless broadband interface, a fiber optic interface, a coaxial cable interface, or another type of wired or wireless interface.

Network interface 50 may be capable of receiving a wide variety of different types of information from network 6, including requests for dynamically-generated CVVs, transaction requests, web page requests, incoming phone calls, incoming text messages, email messages, and other types of information. Furthermore, network interface 50 may be capable of sending a wide variety of different types of information on network 6 including dynamically-generated CVVs, transaction response messages, web pages, outgoing voice messages, text messages, email messages, and other types of information.

When network interface 50 receives data from network 6, network interface 50 may provide the data to a processor 52 in card processing server 10. In some implementations, network interface 50 may also store the data directly into a data storage system 54 in card processing server 10.

As used in this disclosure, a data storage system is a set of one or more computer-readable data storage media. Example types of computer-readable data storage media include random access memory (RAM) units, read-only memory units, flash memory units, write-once read-many memory units, electrically-erasable programmable read-only memory units, zero capacitor RAM units, twin transistor RAM units, CD-ROMs, floppy disks, Digital Versatile Discs (DVDs), High-Definition DVDs, Blu-Ray™ discs, magnetic tape drives, hard disk drives, and/or other types of data storage media. Furthermore, it should be appreciated that one or more of the computer-readable data storage media in data storage system 54 may be removable from card processing server 10 or may be permanently attached to card processing server 10. It should also be appreciated that data storage system 54 may include two or more different types of data storage media. Data storage system 54 may store computer-readable instructions and data.

In the example of FIG. 3, processor 52 is a set of one or more electronic microprocessors, each of which is capable of executing instructions. Processor 52 may include a wide variety of microprocessors. For example, processor 52 may include a Xeon Quad Core microprocessor manufactured by Intel Corporation of Santa Clara, Calif., an Opteron microprocessor manufactured by Advanced Micro Devices, Incorporated of Sunnyvale, Calif., and/or other types of microprocessors.

Figure 5:
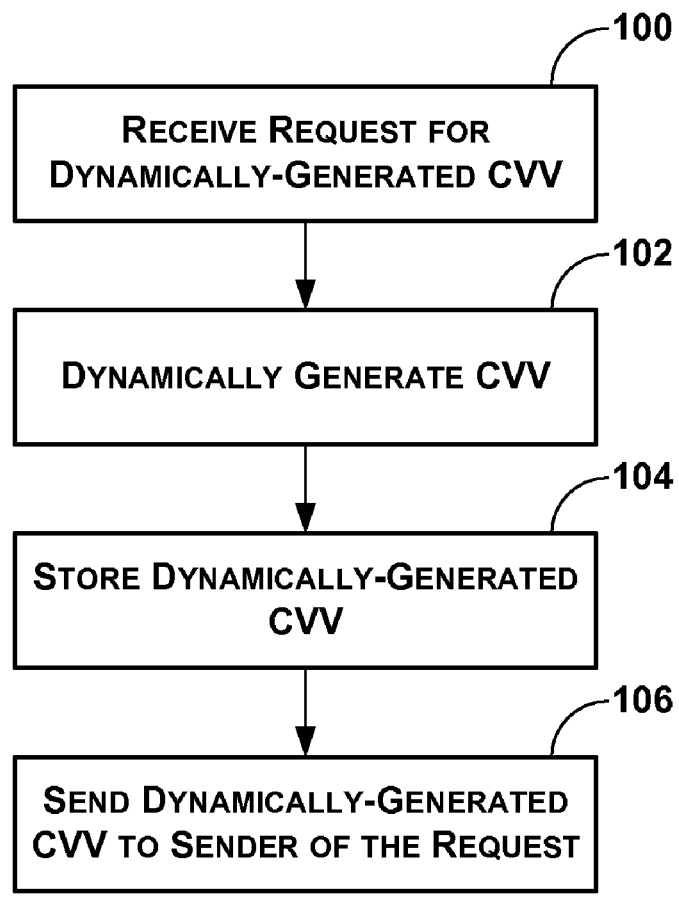
FIG. 5 is a flowchart illustrating example operation of the card processing server when the card processing server receives a request for a dynamically-generated CVV.

As illustrated in the example of FIG. 3, data storage system 54 stores a CVV generator 58. CVV generator 58 may comprise a set of computer-readable instructions. In general terms, when processor 52 executes the instructions of CVV generator 58, card processing server 10 to dynamically generates a CVV for a credit card and stores the dynamically-generated CVV in a CVV database 60. FIG. 5, described in detail below, illustrates an exemplary operation that processor 52 may perform when executing instructions of CVV generator 58.

Figure 7:
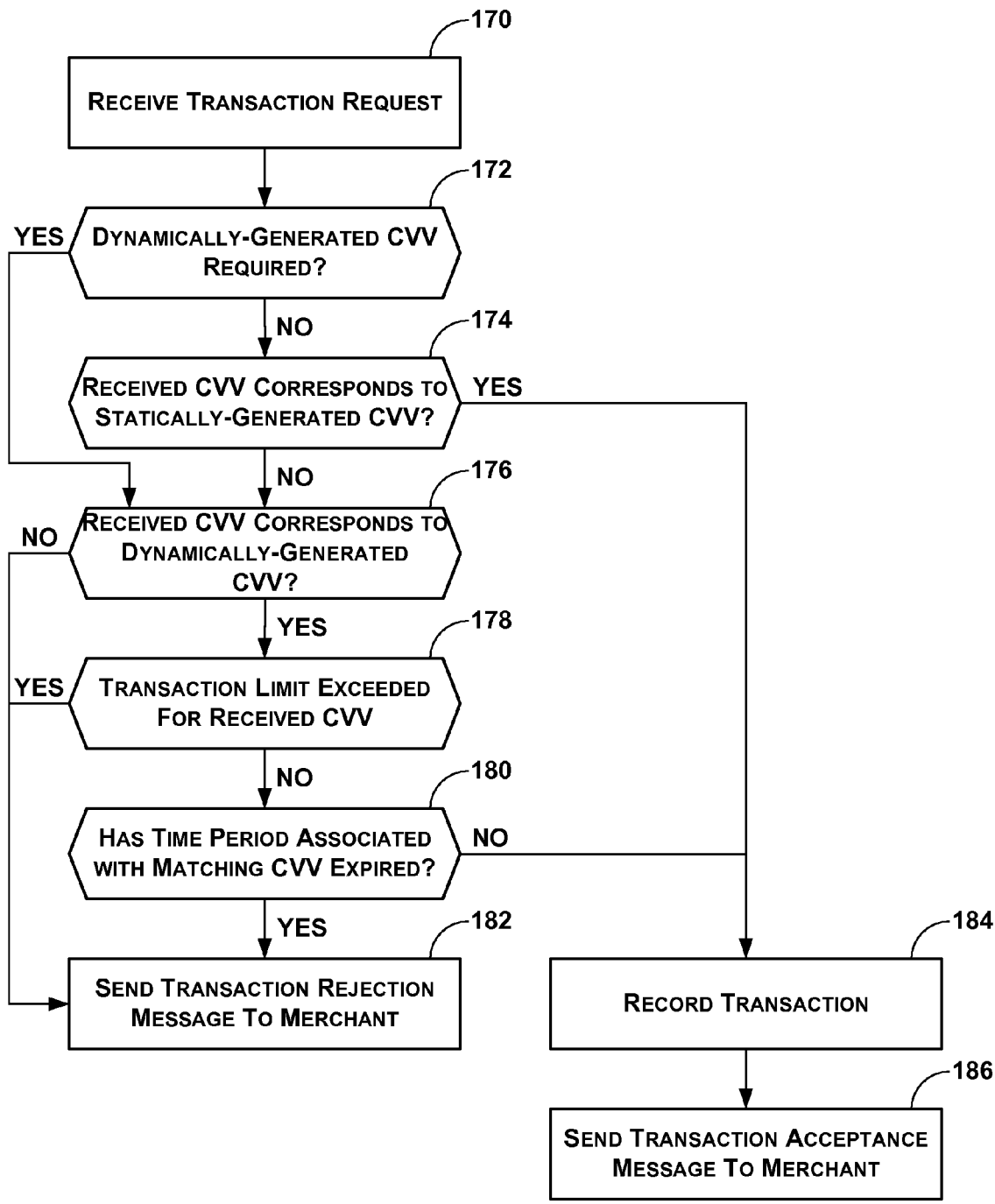
FIG. 7 is flowchart illustrating an example operation of the card processing server when the card processing server receives a transaction request.

Furthermore, in the example of FIG. 3, data storage system 54 stores a transaction processing module 62. Transaction processing module 62 may comprise a set of computer-readable instructions. When processor 52 executes the instructions of transaction processing module 62, card processing server 10 performs a transaction processing operation. In the example of FIG. 3, the instructions of transaction processing module 62 are subdivided into a validation module 64, a message module 66, and a recordation module 68. When processor 52 executes the instructions of validation module 64, card processing server 10 validates a CVV received by network interface 50 as part of a transaction request. When processor 52 executes the instructions of message module 66, network interface 50 sends transaction messages to merchants. When processor 52 executes the instructions of recordation module 68, card processing server 10 records transaction details. FIG. 7, described in detail below, illustrates an exemplary operation that processor 52 may perform when executing instructions of transaction processing module 62.

It should be noted that many other implementations of card processing server 10 are possible and that FIG. 3 is provided for explanatory purposes. For instance, some or all of the functionality associated with CVV generator 58 or transaction processing module 62 may be implemented in hardware. Furthermore, it should be appreciated that card processing server may include many physical components and that data storage system 54 may include many other modules in addition to those illustrated in the example of FIG. 3.

For ease of explanation, the flowcharts illustrated in the examples of FIGS. 4-7 describe CVV generator 58, transaction processing module 62, validation module 64, message module 66, and recordation module 68 as performing certain actions. Such description may be interpreted to mean that card processing server 10 performs such actions when processor 52 executes instructions of CVV generation 58, transaction processing module 62, validation module 64, message module 66, and recordation module 68. Alternatively, if one or more of CVV generator 58, transaction processing module 62, validation module 64, message module 66, and recordation module 68 are implemented in hardware, such description may be interpreted to mean that these units perform such actions independently from processor 52.

Figure 4:
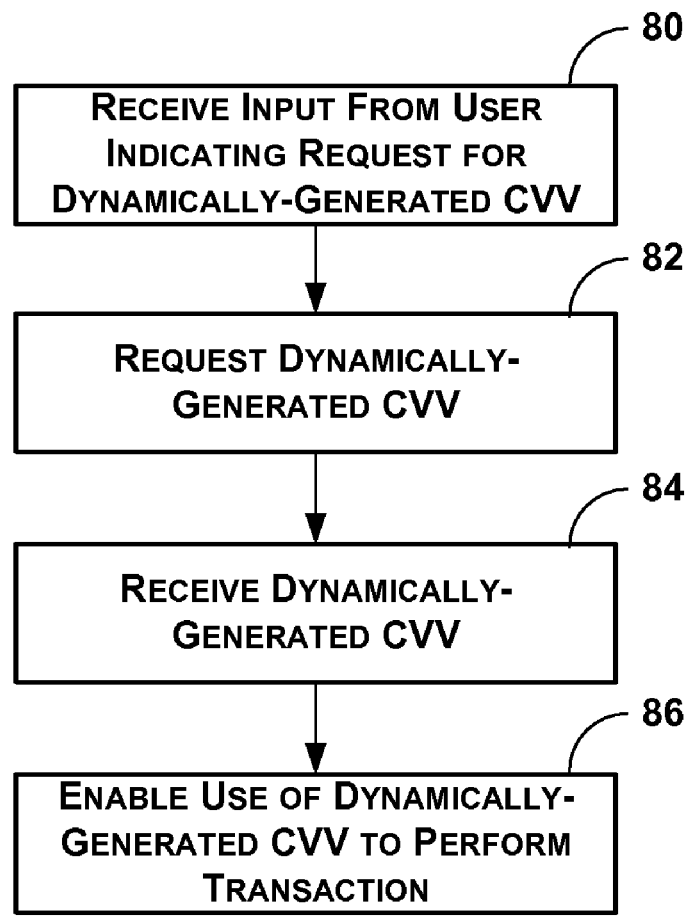
FIG. 4 is a flowchart illustrating example actions of a cardholder device.

FIG. 4 is a flowchart illustrating an example operation of cardholder device 4. In the example of FIG. 4, cardholder device 4 receives input from user 8 (80). The input may indicate a desire of user 8 to request a dynamically-generated CVV for a credit card. For example, cardholder device 4 may receive such input in the form of a mouse click on a submission button of a user interface provided by cardholder device 4.

After cardholder device 4 receives the input, cardholder device 4 requests a dynamically-generated CVV for a credit card (82). For instance, cardholder device 4 may send a communication to card processing server 10 via network 6. In this instance, the communication may indicate a request for a dynamically-generated CVV for the credit card. As described in detail below with regard to FIG. 5, cardholder device 4 may, under some circumstances, receive a dynamically-generated CVV for a credit card without first requesting the dynamically-generated CVV for the credit card.

After cardholder device 4 requests a dynamically-generated CVV for the credit card, cardholder device 4 receives the dynamically-generated CVV for the credit card (84). In this way, user 8 uses cardholder device 4 to receive the dynamically-generated CVV from the card services provider.

Next, cardholder device 4 enables user 8 to uses a card number of the credit card, an expiry date of the credit card, and the dynamically-generated CVV to initiate an economic transaction with a merchant (86). User 8 may interact with cardholder device 4 or another device to initiate the economic transaction. For example, cardholder device 4 may enable user 8 to use the card number of the credit card, an expiry date of the credit card, and the dynamically-generated CVV to initiate an economic transaction by displaying the dynamically-generated CVV. In a second example, cardholder device 4 may be a handheld device that automatically receives a dynamically-generated CVV for the credit card without a request from user 8. In this second example, user 8 may use a personal computer to access a merchant's website. When user 8 is ready to make a purchase from the merchant's website, the handheld device enables user 8 to use the card number of the credit card, the expiry date of the credit card, and the dynamically-generated CVV to initiate an economic transaction by wirelessly communicating the dynamically-generated CVV for the credit card to the personal computer. Upon receiving the dynamically-generated CVV, the personal computer may automatically enter the dynamically-generated CVV into a CVV entry feature of a "check-out" web page of the merchant's website. In this way, user 8 would not need to manually request or enter a dynamically-generated CVV so long as the handheld device is able to wirelessly communicate with the personal computer. Furthermore, in this second example, the handheld device and the personal computer may be configured to only exchange dynamically-generated CVVs if both are configured with a shared secret key. The situation described in this example may be advantageous because it minimizes the number of steps that user 8 must perform in order to initiate an economic transaction using a dynamically-generated CVV and because a potential thief would need access to both the credit card and the mobile device to make a fraudulent purchase.

It should be appreciated that cardholder device 4 may perform the actions described in the example of FIG. 4 in a variety of ways. For example, a data storage system within cardholder device 4 may store instructions. When executed by a processor within cardholder device 4, the instructions may cause cardholder device 4 to perform the actions described in the example of FIG. 4 and/or other actions. In another example, cardholder device 4 may comprise one or more hardware units that perform one or more of the actions described in the example of FIG. 4.

FIG. 5 is a flowchart illustrating an example operation of card processing server 10 when card processing server 10 receives a request for a dynamically-generated CVV for a credit card. Initially, network interface 50 in card processing server 10 receives a request for a dynamically-generated CVV for a credit card (100). In response to the request, CVV generator 58 in card processing server 10 dynamically generates a CVV for the credit card (102).

CVV generator 58 generates the CVV based, at least in part, on a card number of the credit card, an expiry date of the credit card, and a dynamic service code. CVV generator 58 selects the dynamic service code such that the dynamically-generated CVV is substantially unpredictable based on previously released dynamically-generated CVVs for the credit card. For instance, CVV generator 58 may use a pseudo-random process to select the dynamic service code while ensuring that the selected dynamic service code is not equal to one or more previously selected dynamic service codes for the credit card. Because CVV generator 58 selects the dynamic service code such that the dynamically-generated CVV is substantially unpredictable based on previously released dynamically-generated CVVs for the credit card, it may be impossible or very difficult for a would-be thief to guess or discover a valid dynamically-generated CVV for the credit card, even if the would-be thief has access to previously released dynamically-generated CVVs for the credit card.

After CVV generator 58 generates the dynamically-generated CVV, CVV generator 58 stores the dynamically-generated CVV into CVV database 60 (104). When CVV generator

58 stores the dynamically-generated CVV into CVV database 60, CVV generator 58 may also store, in CVV database 60, validation information. For example, the validation information may indicate a time period during which the dynamically-generated CVV is valid. In this example, CVV generator 58 may store, in CVV database 60, validation information that indicates that the dynamically-generated CVV is valid for 24 hours starting at 3:30 PM on Jan. 6, 2008.

Next, network interface 50 sends, via network 6, a set of data indicating the dynamically-generated CVV to cardholder device 4 (106). Network interface 50 may send a wide variety of different types of data that indicate the dynamically-generated CVV. For example, network interface 50 may send a web page that includes text that specifies the dynamically-generated CVV. In a second example, network interface 50 may send data that does not explicitly indicate the dynamically-generated CVV. In this second example, network interface 50 may, for instance, send a picture of a horse. User 8 may know that pictures of horses indicate dynamically-generated CVVs equal to "528". In a third example, network interface 50 may send data that represents a vocalization of the dynamically-generated CVV.

In some implementations, CVV generator 58 may dynamically generate, and network interface 50 may send, a CVV for a credit card without first receiving a request for a dynamically-generated CVV for the credit card. For example, CVV generator 58 may dynamically generate, and network interface 50 may send, a CVV for a credit card on a periodic basis. In this example, CVV generator 58 may generate a new dynamically-generated CVV for the credit card on a daily basis. In another example, CVV generator 58 may automatically generate a new dynamically-generated CVV for a credit card whenever an economic transaction is performed using an outstanding dynamically-generated CVV for the credit card. Automatically generating dynamically-generated CVVs in this manner may be advantageous in situations where it is inconvenient or time-intensive to manually request a dynamically-generated CVV.

Figure 6:
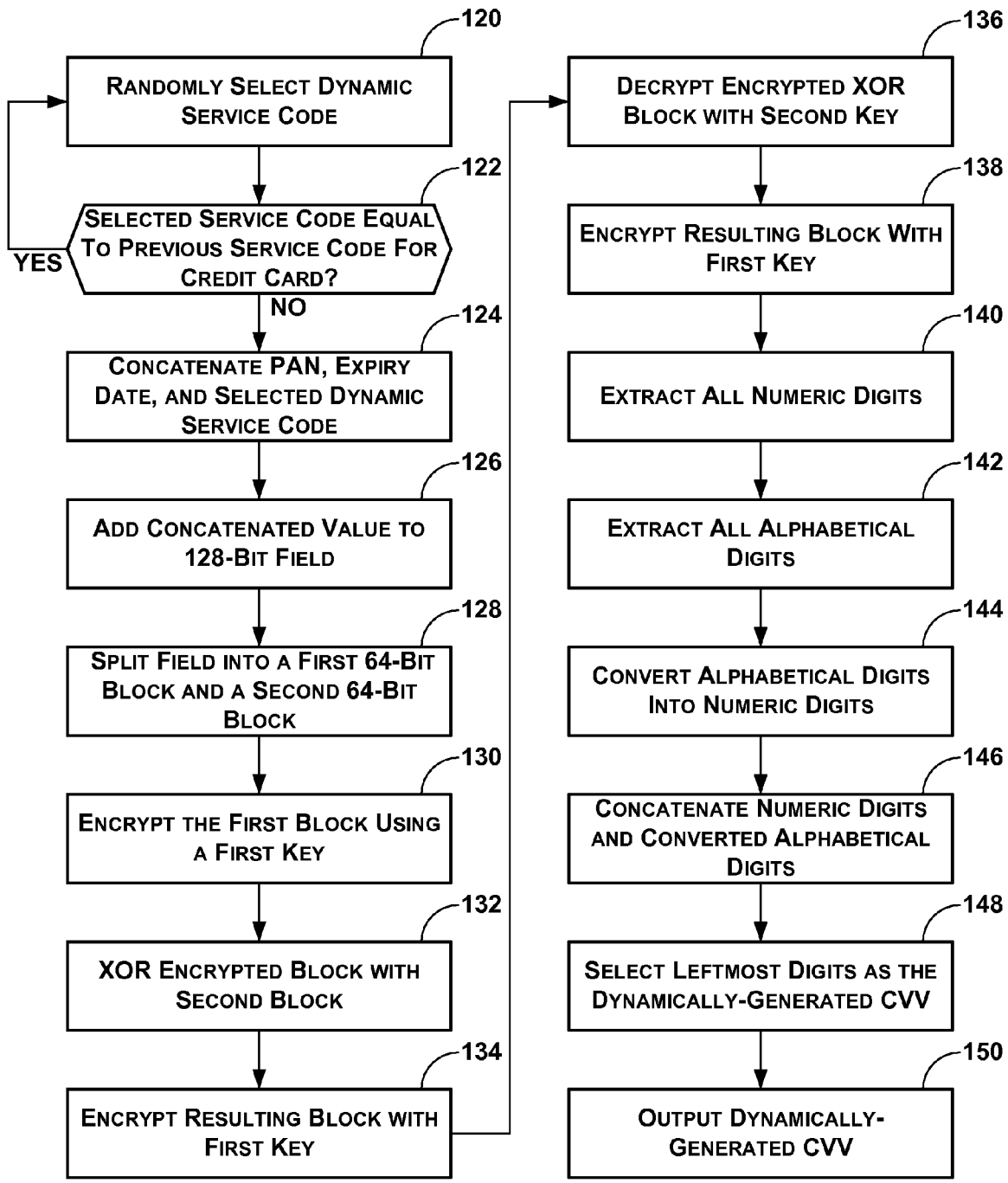
FIG. 6 is a flowchart illustrating an example operation of the card processing server to dynamically generate a CVV.

FIG. 6 is a flowchart illustrating an example operation to dynamically generate a CVV for a credit card. In order to dynamically generate a CVV for a credit card, CVV generator 58 uses a pseudo-random process to select a dynamic service code (120). For example, CVV generator 58 may random select the dynamic service code "101."

After selecting the dynamic service code, CVV generator 58 determines whether the selected dynamic service code is equal to a dynamic service code used to generate a previously-released dynamically-generated CVV for the credit card (122). For example, CVV generator 58 may store the last five dynamic service codes used to generate the previous five dynamically-generated CVVs for the credit card. If the selected dynamic service code is equal to any of the stored dynamic service codes, CVV generator 58 may determine that the selected dynamic service code is equal to a dynamic service code used to generate a previously-released dynamically-generated CVV for the credit card.

If CVV generator 58 determines that the selected dynamic service code is equal to a dynamic service code used to generate a previously-released dynamically-generated CVV for the credit card ("YES" of 122), CVV generator 58 loops back and again selects a dynamic service code (120). For instance, if CVV generator 58 selected the dynamic service code "101" and the last five dynamic service codes for the credit card were "425," "637," "101," "302," and "321," CVV generator 58 would loop back and again select a dynamic service code.

On the other hand, if CVV generator 58 determines that the selected dynamic service code is not equal to a dynamic service code used to generate a previously-released dynamically-generated CVV for the credit card ("NO" of 122), CVV generator 58 concatenates the card number of the credit card, the expiry date of the credit card, and the selected dynamic service code (124). For example, if the card number of the credit card is "4123456789012345," the expiry date of the credit card is "8701," and the selected dynamic service code is "101," the resulting concatenated value may be "41234567890123458701101."

After concatenating the values, CVV generator 58 adds a number that represents the concatenated value as the most-significant bits of a 128-bit field (126). Continuing the previous example, 0x549561F6A13D672D is a hexadecimal number equivalent to the decimal number 41234567890123458701101. In this example, CVV generator 58 adds the hexadecimal number 0x549561F6A13D672D to the most-significant 64 bits of the 128-bit field, thereby leaving the 64 least significant bits of the 128-bit field as zeros.

Next, CVV generator 58 splits the field into a first 64-bit block and a second 64-bit block (128). CVV generator 58 then encrypts the first 64-bit block using a first encryption key (130). Next, CVV generator 58 performs an exclusive-or (XOR) operation on the encrypted first block and the second 64-bit block (132). CVV generator 58 then encrypts the resulting XOR'ed block with the first encryption key (134). After encrypting the XOR'ed block with the first encryption key, CVV generator 58 decrypts the encrypted XOR'ed block with a second encryption key (136). CVV generator 58 then encrypts this block with the first encryption key (138). A 128-bit hexadecimal number results from the encryption of this block with the first encryption key.

After encrypting the block with the first encryption key, CVV generator 58 extracts all numeric digits (i.e., 0 through 9) from the block (140). CVV generator 58 then extracts all alphabetical digits (i.e., A through F) from the block (142). Next, CVV generator 58 converts the alphabetical digits into numeric digits (144). For instance, CVV generator 58 may convert the alphabetical digits into numeric digits by subtracting 10 from each of the alphabetic digits.

CVV generator 58 then concatenates the numeric digits and the converted alphabetical digits (146). After concatenating the numeric digits and the converted alphabetical digits, CVV generator 58 selects the leftmost three digits of the concatenated block as the dynamically-generated CVV (148). CVV generator 58 then outputs the dynamically-generated CVV (150).

FIG. 7 is flowchart illustrating an example operation of card processing server 10 when card processing server 10 receives a transaction request. Initially, card processing server 10 receives a transaction request from a merchant (170). The transaction request specifies a card number of a credit card (i.e., the received card number), an expiry date of the credit card (i.e., the received expiry date), and a CVV (i.e., the provided CVV). In addition, the transaction request may specify an amount to be charged to an account of a cardholder of the credit card. For example, the transaction request may specify that $524.24 is to be charged to the account of the cardholder of the credit card. In addition, the transaction request may identify a merchant to whom payment is to be made. For example, the transaction request may specify that payment is to be made to a merchant called "Selma's Sporting Goods."

After card processing server 10 receives the transaction request, validation module 64 determines whether the transaction request is occurring in a situation in which a dynamically-generated CVV for the credit card is required to successfully complete economic transactions using the credit card (172). There may be many situations in which a dynamically-generated CVV is required to successfully complete economic transactions. In an first example, a currency amount for an economic transaction above which a dynamically-generated CVV for the credit card is required to successfully complete an economic transaction using the credit card. In a second example, a current amount for a time period above which a dynamically-generated CVV for the credit card is required to successfully complete an economic transaction using the credit card. In a third example, a type of merchant for which a dynamically-generated CVV for the credit card is required to successfully complete an economic transaction using the credit card with a merchant belonging to the type of merchant. In a fourth example, a geographic location for which a dynamically-generated CVV for the credit card is required to successfully complete an economic transaction using the credit card with a merchant in the geographic location. In a fifth example, a number of economic transactions for which a dynamically-generated CVV for the credit card is required to successfully complete an economic transaction using the credit card when the credit card is used in more than the specified number of economic transactions during a given time period. It should be appreciated that many other situations may exist in which a dynamically-generated CVV for a credit card is required in order to successfully complete an economic transaction with the credit card. The situations may be established as a matter of user preference. For example, user 8 may provide user preference input to a card service provider. The user preference input specifies the situations in which a dynamically-generated CVV for a credit card is required to successfully complete an economic transaction using the credit card.

If validation module 64 determines that a dynamically-generated CVV for the credit card is not required ("NO" of 172), validation module 64 determines whether the provided CVV corresponds to a statically-generated CVV for the credit card (174). To determine whether the provided CVV corresponds to the statically-generated CVV for the credit card, validation module 64 may, in one exemplary implementation, calculate the statically-generated CVV for the credit card based on the received card number, the received expiry date, and a service code that is equal to zero. In another exemplary implementation, validation module 64 may use the received card number to retrieve the statically-generated CVV for the credit card from a database that stores statically-generated CVVs for credit cards. After calculating the statically-generated CVV or retrieving the statically-generated CVV, validation module 64 may determine whether the provided CVV matches the calculated or retrieved statically-generated CVV. It should be noted that in some circumstances, the provided CVV may correspond to a CVV even though the provided CVV does not exactly the CVV.

If the provided CVV does not correspond to the statically-generated CVV for the credit card ("NO" of 174) or if validation module 64 determines that a dynamically-generated CVV is required ("YES" of 172), validation module 64 determines whether the provided CVV corresponds to a dynamically-generated CVV for the credit card (176). To determine whether the provided CVV corresponds to a dynamically-generated CVV for the credit card, validation module 64 may use the provided card number to retrieve a set of one or more dynamically-generated CVVs for the credit card from CVV database 60. For example, validation module 64 may use the provided card number to retrieve the values "364", "127", and "873" from CVV database 60. After retrieving the set of one or more dynamically-generated CVVs for the credit card from CVV database 60, validation module 64 may determine that the provided CVV corresponds to one of the dynamically-generated CVV for the credit card retrieved from CVV database 60. Continuing the previous example, if the provided CVV is equal to "127", validation module 64 may determine that the provided CVV corresponds to a dynamically-generated CVVs of the credit card because one of the dynamically-generated CVVs retrieved from CVV database 60 is equal to "127."

If validation module 64 determines that the provided CVV corresponds to one of the dynamically-generated CVVs for the credit card ("YES" of 176), validation module 64 determines whether a transaction limit has been exceeded for the provided CVV (178). The transaction limit for a dynamically-generated CVV is a number that indicates how many economic transactions may use the dynamically-generated CVV. For instance, validation module 64 may be configured such that a dynamically-generated CVV for a credit card may only be used in a single economic transaction with the credit card. In other circumstances, validation module 64 may be configured such that a dynamically-generated CVV for a credit card may be used in multiple economic transactions with the credit card. Furthermore, different dynamically-generated CVVs for a credit card may be used in different numbers of economic transactions with the credit card. For instance, a first dynamically-generated CVV for the credit card may only be used in a single economic transaction with the credit card and a second dynamically-generated CVV for the credit card may be used in three economic transactions with the credit card.

If validation module 64 determines that the transaction limit has not been exceeded for the provided CVV ("NO" of 178), validation module 64 determines whether a time period associated with the one of the dynamically-generated CVVs that corresponds to the provided CVV has expired (180). For ease of explanation, this disclosure refers to the dynamically-generated CVV for the credit card that corresponds to the provided CVV as the "corresponding CVV." To determine whether the time period associated with the corresponding CVV has expired, validation module 64 may, in one exemplary implementation, retrieve information from CVV database 60 that indicates a time period associated with the corresponding CVV. For instance, validation module 64 may retrieve validation information from CVV database 60 that indicates that the corresponding CVV is associated with a time period lasting from 6:30 AM on Jan. 17, 2008 to 6:30 AM on Jan. 19, 2008. After retrieving the validation information that indicates the time period associated with the matching CVV, validation module 64 may determine that the time period associated with the matching CVV has expired with when the current time is not within the time period associated with the matching CVV.

If validation module 64 determines that the time period associated with the corresponding CVV has expired ("YES" of 180), or if the transaction limit for the provided CVV has been exceeded ("YES" of 178), or if validation module 64 determines that the provided CVV does not correspond to any of the dynamically-generated CVVs for the credit card ("NO" of 176), message module 66 sends a transaction rejection message to the merchant specified in the transaction request (182). Message module 66 sends the transaction rejection message because validation module 64 has determined that the provided CVV is not valid. The transaction rejection message indicates to the merchant that the transaction request has been rejected. In some circumstances, the transaction rejection message may indicate that the requested economic transaction is likely fraudulent.

On the other hand, if validation module 64 determines that the time period associated with the matching CVV has not expired ("NO" of 180) or if validation module 64 determines that the provided CVV corresponds to the statically-generated CVV for the credit card ("YES" of 174), recordation module 68 records the economic transaction (184). When recordation module 68 records the economic transaction, recordation module 68 records a charge against the account of the cardholder of the credit card in the amount specified by the transaction request. For example, if the transaction request specifies the amount of $524.24, recordation module 68 may record a charge of $524.24 against the account of the cardholder of the credit card. The cardholder is obligated to pay all charges against the account of the cardholder to the card issuer. The cardholder may pay charges against the account of the cardholder in the form of a monthly remittance to the card issuer.

In addition, when recordation module 68 records the economic transaction, recordation module 68 records a charge in the amount specified by the transaction request less any processing fees against the account of the card issuer of the credit card in favor of the merchant. For example, if the transaction request specifies the amount of $524.24 and the card issuer charges a 2% processing fee, recordation module 68 may record a charge of $514.73 against the account of the card issuer in favor of the merchant. The card issuer is obligated to pay all charges in favor of merchants to the merchants on a continuous or periodic basis.

After recordation module 68 records the economic transaction, message module 66 sends a transaction acceptance message to the merchant specified in the transaction request (186). The transaction acceptance message indicates that the economic transaction has been accepted. In some implementations, the transaction acceptance message may include a confirmation number that may be subsequently used to retrieve information associated with the economic transaction.

Those of skill in the art would appreciate that transaction processing module 62 may perform many other actions in addition to those described in the example operation illustrated in FIG. 7. For example, transaction processing module 62 may use the well-known Luhn algorithm to perform an operation to determine whether the received card number is valid. In another example, recordation module 68 may only record the economic transaction when transaction processing module 62 has determined that the cardholder of the credit card has exceeded his or her credit limit for the credit card.

Figure 8:
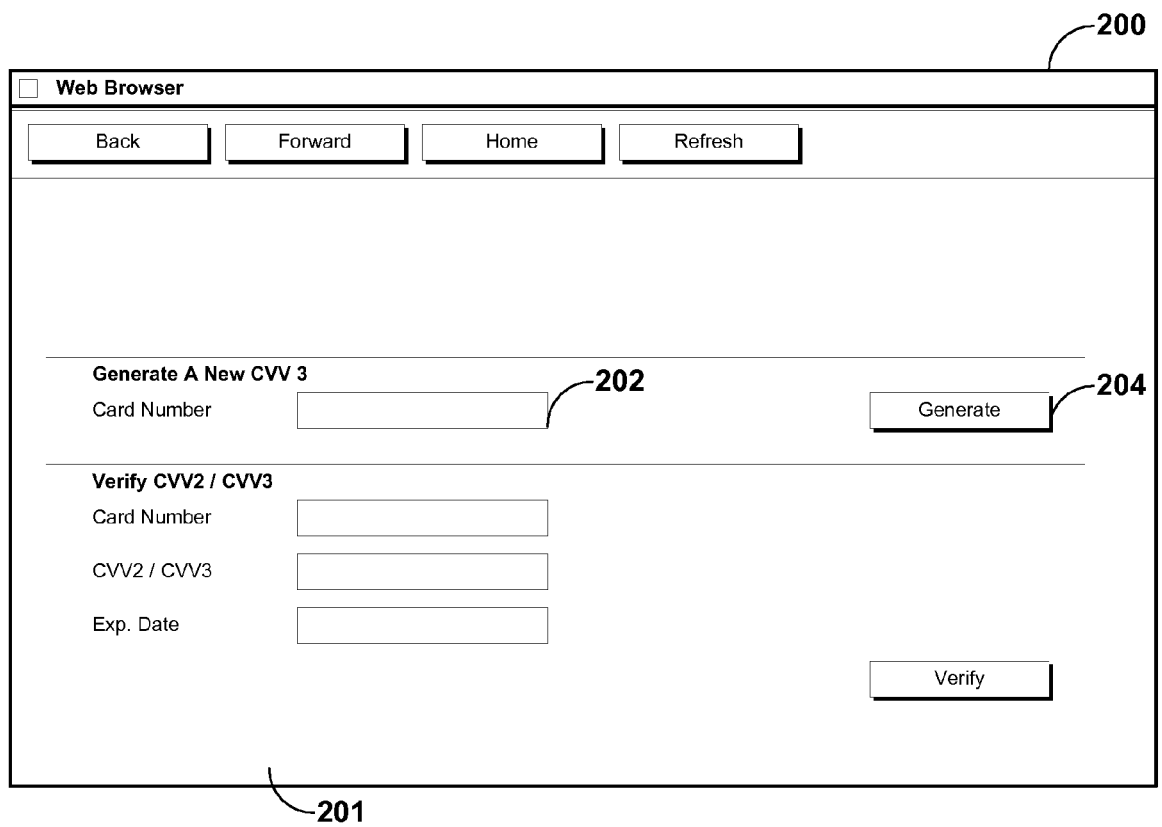
FIG. 8 is a screenshot of an example user interface that may be used to request a dynamically-generated CVV.

FIG. 8 is a screenshot of an example user interface 200 that user 8 may use to request a dynamically-generated CVV. As illustrated in the example of FIG. 8, user interface 200 includes a web page 201 presented by a web browser application executing on a cardholder device (e.g., cardholder device 4).

Web page 201 includes a card number entry feature 202 and a generate feature 204. When user 8 enters a card number for a credit card into card number entry feature 202 and then clicks on generate feature 204, the web browser application may submit the card number to card processing server 10. In this way, user 8 may use user interface 200 to request a dynamically-generated CVV for the credit card.

Figure 9:
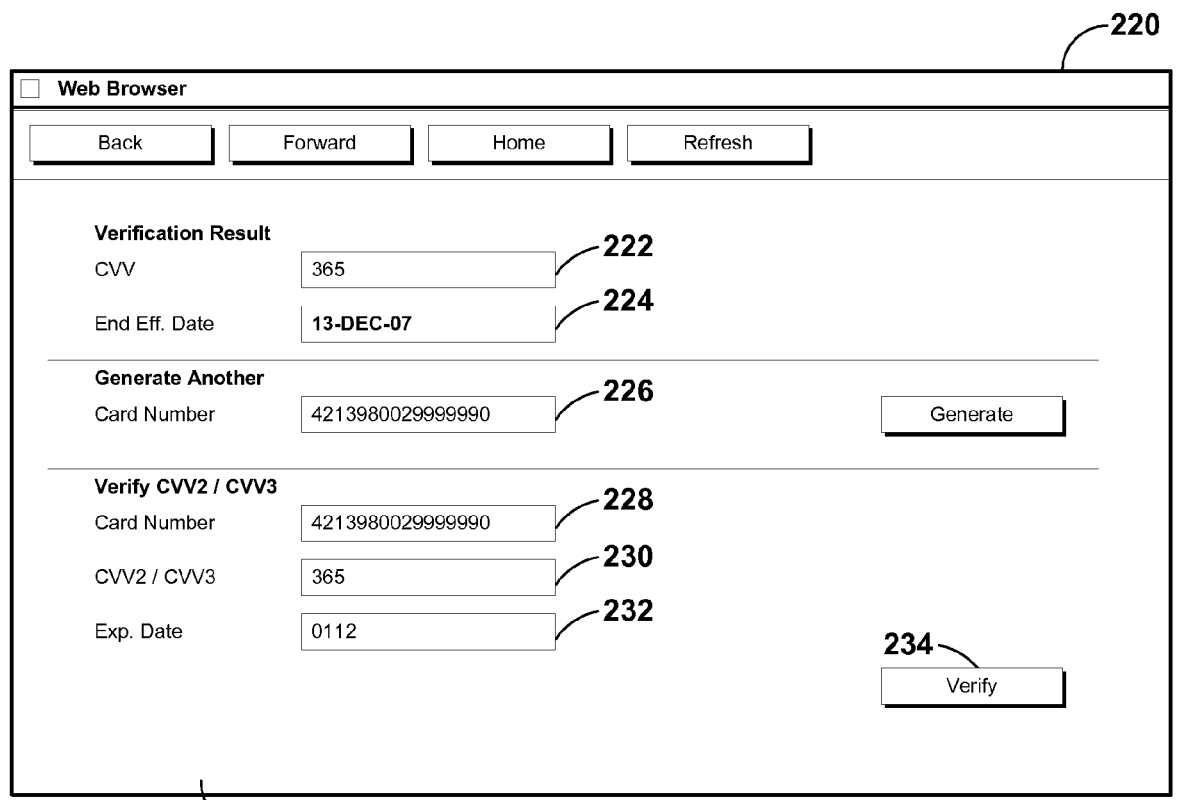
FIG. 9 is a screenshot of an example user interface that may be used to receive the dynamically-generated CVV.

FIG. 9 is a screenshot of an example user interface 220 that user 8 may use to receive a dynamically-generated CVV. As illustrated in the example of FIG. 9, user interface 220 includes a web page 221 presented by a web browser application executing on a cardholder device (e.g., cardholder device 4). The web browser application may present user interface 220 when cardholder device 4 receives web page 221 from card processing server 10 in response to a request for a dynamically-generated CVV for a credit card. In other words, the web browser application may present user interface 220 when cardholder device 4 receives a dynamically-generated CVV for a credit card.

Web page 221 includes a feature 222 that specifies a dynamically-generated CVV for a credit card. As illustrated in the example of FIG. 9, the dynamically-generated CVV for a credit card is "365". Furthermore, in the example of FIG. 9, the dynamically-generated CVV for the credit card is referred to as "CVV3" to distinguish the dynamically-generated CVV from the CVV1 stored in the magnetic stripe of the credit card and the CVV2 printed on the credit card.

In addition, web page 221 includes a feature 224 that specifies a last effective date of the dynamically-generated CVV for the credit card. The last effective date of a dynamically-generated CVV is the last day before the dynamically-generated CVV expires. As illustrated in the example of FIG. 9, the last effective date of the dynamically-generated CVV is Dec. 13, 2007. In other words, the dynamically-generated CVV cannot be used after Dec. 13, 2007.

Web page 221 also includes a feature 226 that allows user 8 to request an additional dynamically-generated CVV for a same or a different credit card. In the example of FIG. 9, user 8 has entered the card number "4213980029999990" into feature 226.

In addition, user interface 220 includes verification features 228, 230, 232, and 234. Feature 228 allows user 8 to enter a card number of a credit card, feature 230 allows user 8 to enter a CVV2 for the credit card or a "CVV3" for the credit card, and feature 232 allows user 8 to enter an expiry date for the credit card. In the example of FIG. 9, user 8 has entered the card number "4213980029999990" into feature 228 and the CVV2/CVV3 "365" into feature 230. When user 8 selects feature 234, the web browser application may submit the information entered into features 228, 230, and 232 to card processing server 10. In response, card processing server 10 may send a web page that indicates whether the entered CVV2/CVV3 is a valid CVV2/CVV3 for the credit card described by the card number entered in feature 228 and the expiry date entered in feature 232. User 8 may want to use verification features 228, 230, 232, and 234 to determine whether a previously requested dynamically-generated CVV for a credit card is still valid.

FIG. 10 is a screenshot of an example user interface 240 in which a dynamically-generated CVV has been successfully verified. As illustrated in the example of FIG. 10, user interface 240 includes a web page 241 presented by a web browser application executing on a cardholder device (e.g., cardholder device 4). Web page 241 includes most of the features of user interface 220 (FIG. 9). However, web page 241 includes a feature 242 that indicates whether the CVV2/CVV3 entered in verification feature 230 is a valid CVV2/CVV3 for the credit card described by the card number entered in feature 228 and the expiry date entered in feature 232. In the example of FIG. 10, feature 242 specifies a "Y" indicating that the CVV2/CVV3 entered in verification feature 230 is a valid CVV2/CVV3 for the credit card described by the card number entered in feature 228 and the expiry date entered in feature 232.

FIG. 11 is a screenshot of an example user interface 250 in which a dynamically-generated CVV has not been successfully verified. As illustrated in the example of FIG. 11, user interface 250 includes a web page 251 presented by a web browser application executing on a cardholder device (e.g., cardholder device 4). Web page 251 includes the features of web page 241 (FIG. 10). However, in the example of FIG. 11, feature 242 specifies an "N" indicating that the CVV2/CVV3 entered in feature 230 is not a valid CVV2/CVV3 for the credit card described by the card number entered in feature 228 and the expiry date entered in feature 232.

The above specification, examples, and data have been described in language specific to structural features and/or methodological acts. Nevertheless, it is to be understood that the subject matter defined in the following claims is not necessarily limited to the specific features or acts described above. Rather, the specific features and acts described above are disclosed as example forms that implement the claims.

The invention claimed is:

1. A computer-readable medium comprising instructions that, when executed by a processor, cause an electronic computing system including a card processing server to:
   automatically select a dynamic service code such that the dynamic service code is substantially unpredictable based on previously requested dynamically-generated card verification values (CVVs) for a transaction card;
   automatically generate a dynamically-generated CVV for the transaction card, wherein the dynamically-generated CVV is based on a card number of the transaction card, an expiry date of the transaction card, and the dynamic service code, and wherein the instructions cause the card processing server to:
      concatenate the card number of the transaction card, the expiry date of the transaction card, and the dynamic service code, thereby generating a first value;
      pad the first value with zeroes such that the first value includes 128 bits, thereby generating a second value;
      split the second value into a first 64-bit block and a second 64-bit block;
      encrypt the first 64-bit block with a first encryption key, thereby generating a third value;
      perform an "exclusive or" operation on the third value and the second 64-bit block, thereby generating a fourth value;
      encrypt the fourth value with the first encryption key, thereby generating a fifth value;
      decrypt the fifth value with a second encryption key, thereby generating a sixth value;
      encrypt the sixth value with the first encryption key, thereby generating a seventh value;
      extract all numeric digits in the seventh value, thereby generating an eighth value;
      extract all alphabetical digits in the seventh value, thereby generating a ninth value;
      convert the ninth value into numeric digits, thereby generating a tenth value;
      concatenate the eighth value and the tenth value, thereby generating an eleventh value; and
      select a leftmost three digits of the eleventh value as the dynamically-generated CVV;
   automatically send, from the card processing server to a cardholder device, a first set of data, the first set of data indicating the dynamically-generated CVV;
   in response to receiving a transaction request, automatically determine whether a provided CVV corresponds to the dynamically-generated CVV, the transaction request is a request for an economic transaction, the transaction request specifying the provided CVV and a card number of the transaction card; and
   record a charge against an account of a cardholder of the transaction card when it is determined that the provided CVV corresponds to the dynamically-generated CVV.

2. The computer-readable medium of claim 1, wherein the instructions cause the card processing server to send the first set of data comprise instructions that cause the card processing server to automatically sending the first set of data without first receiving a request for the dynamically-generated CVV.

3. The computer-readable medium of claim 2, wherein the instructions further cause the card processing server to:
   automatically select additional service codes for the transaction card, wherein additional dynamically-generated CVVs for the transaction card are substantially unpredictable based on other dynamically-generated CVVs for the transaction card, each of the additional dynamically-generated CVVs being a sequence of characters based on the card number of the transaction card, the expiry date of the transaction card, and the additional service codes for the transaction card; and
   automatically send, on a periodic basis, additional sets of data from the card processing server to the cardholder device, each of the additional sets of data indicating one of the additional dynamically-generated CVVs.

4. The computer-readable medium of claim 1,
   wherein the instructions further cause the card processing server to, in response to receiving the transaction request, determine whether a transaction limit has been exceeded, the transaction limit indicating how many economic transactions are permitted to specify the CVV specified in the transaction request; and
   wherein the instructions that cause the card processing server to record the charge comprises instructions that cause the card processing server to record the charge against the account of the cardholder when it is determined that the provided CVV corresponds to the dynamically-generated CVV and the transaction limit has not been exceeded.

5. The computer-readable medium of claim 1, wherein the instructions that cause the card processing server to select the dynamic service code comprise instructions that cause the card processing server to use a pseudo-random process to select the dynamic service code.

6. The computer-readable medium of claim 1, further comprising instructions that cause the card processing server to:
   when it is determined that the provided CVV does not correspond to the dynamically-generated CVV, automatically send a transaction rejection message from the card processing server to a merchant who sent the transaction request; and
   when it is determined that the provided CVV corresponds to the dynamically-generated CVV, automatically send a transaction acceptance message from the card processing server to the merchant.

7. The computer-readable medium of claim 1, further comprising instructions that cause the card processing server to:
   determine whether the CVV specified in the transaction request corresponds to a statically-generated CVV for the transaction card; and
   record the charge against the account of the cardholder of the transaction card when it is determined that the CVV specified in the transaction request corresponds to the statically-generated CVV for the transaction card.

8. The computer-readable medium of claim 1,
   wherein the computer-readable medium further comprises instructions that enable the card processing server to receive, at the card processing server, a CVV request from the cardholder device, the CVV request indicating that the cardholder device is requesting a dynamically generated CVV for the transaction card; and wherein the instructions that cause the card processing server to send the first set of data comprise instructions that cause the card processing server to send the first set of data in response to the CVV request.

9. The computer-readable medium of claim 1, wherein the instructions that cause the card processing server to send the first set of data comprise instructions that cause the card processing server to automatically send a text message from the card processing server to the cardholder device, the text message containing the first set of data.

10. The computer-readable medium of claim 1, wherein the instructions that cause the card processing server to send the first set of data comprise instructions that cause the card processing server to automatically output signals that represent a vocalization of the dynamically-generated CVV.

11. The computer-readable medium of claim 1,
wherein the computer-readable medium further comprises instructions that cause the card processing server to automatically determine, in response to receiving the transaction request, whether a time period associated with the dynamically-generated CVV has expired; and
wherein the instructions that cause the card processing server to record the charge comprises instructions that cause the card processing server to automatically record the charge against the account of the cardholder only when it is further determined that the time period associated with the dynamically-generated CVV has not expired.

12. The computer-readable medium of claim 1, wherein the computer-readable medium further comprises instructions that cause the card processing server to:
in response to receiving the transaction request, automatically determine whether the economic transaction is occurring in a situation in which a dynamically-generated CVV is required to successfully complete economic transactions using the transaction card;
determine whether the provided CVV is a dynamically-generated CVV; and
reject the economic transaction when it is determined that the economic transaction is occurring in a situation in which a dynamically-generated CVV is required to successfully complete the economic transaction using the transaction card and when it is determined that the provided CVV is not a dynamically-generated CVV.

13. The computer-readable medium of claim 12,
wherein the computer-readable medium further comprises instructions that enable the card processing server to receive user preference input that indicates the situation; and
wherein the instructions that enable the card processing server to receive the user preference input comprises instructions that enable the card processing server to receive user preference input that specifies one or more of types of user preference input selected from a group consisting of:
a currency amount for an economic transaction above which a dynamically-generated CVV for the transaction card is required to successfully complete an economic transaction using the transaction card,
a currency amount for a time period above which a dynamically-generated CVV for the transaction card is required to successfully complete an economic transaction using the transaction card,
a type of merchant for which a dynamically-generated CVV for the transaction card is required to successfully complete an economic transaction using the transaction card with a merchant belonging to the type of merchant,
a geographic location for which a dynamically-generated CVV for the transaction card is required to successfully complete an economic transaction using the transaction card with a merchant in the geographic location, and
a number of economic transactions for which a dynamically-generated CVV for the transaction card is required to successfully complete an economic transaction using the transaction card when the transaction card is used more than the number of economic transactions during a given time period.

* * * * *